US006964352B2

(12) United States Patent
Werth

(10) Patent No.: US 6,964,352 B2

(45) Date of Patent: Nov. 15, 2005

(54) VALVE FOR A REFRIGERATOR WATER DISPENSER

(75) Inventor: Albert A. Werth, Kewadin, MI (US)

(73) Assignee: Twin Bay Medical, Inc., Traverse City, MI (US)

(*) Notice: Subject to any disclaimer, the term of this patent is extended or adjusted under 35 U.S.C. 154(b) by 0 days.

(21) Appl. No.: 10/829,497

(22) Filed: Apr. 22, 2004

(65) Prior Publication Data

US 2004/0211790 A1 Oct. 28, 2004

Related U.S. Application Data

(60) Provisional application No. 60/464,791, filed on Apr. 23, 2003.

(51) Int. Cl.[7] .................................................. B67D 5/62

(52) U.S. Cl. .................. 222/146.6; 222/212; 222/214; 62/389; 251/9

(58) Field of Search ................................ 222/212, 214, 222/215, 450, 146.6, 207, 129.1; 251/7, 9; 604/250; 62/389–391; 417/474, 480

(56) References Cited

U.S. PATENT DOCUMENTS

| | | | | |
|---|---|---|---|---|
| 1,677,453 A * | 7/1928 | Jones | ......................... | 137/595 |
| 2,377,261 A * | 5/1945 | Norris | ......................... | 222/184 |
| 3,598,289 A * | 8/1971 | Norris | ......................... | 222/80 |
| 4,256,242 A * | 3/1981 | Christine | ..................... | 222/207 |
| 4,372,345 A * | 2/1983 | Mehus | ....................... | 137/636 |
| 4,407,434 A * | 10/1983 | Kempf | ....................... | 222/214 |
| 4,895,276 A * | 1/1990 | Maldonado | .............. | 222/144.5 |
| 4,961,508 A * | 10/1990 | Weimer et al. | ............. | 222/214 |
| 5,257,978 A * | 11/1993 | Haber et al. | ................ | 604/250 |
| 5,380,172 A * | 1/1995 | Ulbing | ....................... | 417/476 |
| 5,881,930 A | 3/1999 | Lee | ............................ | 222/509 |
| 5,927,956 A * | 7/1999 | Lim et al. | .............. | 417/477.13 |
| 6,003,734 A | 12/1999 | Oh | .......................... | 222/146.6 |
| 6,340,096 B1 | 1/2002 | Zerfas | .......................... | 222/1 |
| 6,425,425 B2 | 7/2002 | Bianchi et al. | ............. | 141/362 |
| 6,830,076 B1 * | 12/2004 | Patel | .......................... | 138/110 |

* cited by examiner

*Primary Examiner*—Frederick Nicolas

(74) *Attorney, Agent, or Firm*—Young & Basile, P.C.

(57) ABSTRACT

A water dispenser valve assembly with a tube connected to a water supply providing a passageway for the fluid. The water dispenser assembly has a spring assembly including a pivot member operably connected to a leaf spring. A pinch member is connected to the leaf spring for moving against the tube to close the passageway. The spring assembly is biased to close the passageway in the tube. An activation member activated by a user moves the pivot member to apply a force on the leaf spring causing the leaf spring to invert back away from the tube and disengage the pinch member from the tube to allow fluid to flow through the passageway.

17 Claims, 5 Drawing Sheets

VALVE FOR A REFRIGERATOR WATER DISPENSER

This application claims priority of provisional patent application 60/464,791 filed on Apr. 23, 2003.

FIELD OF THE INVENTION

The present invention relates to a valve for a water dispenser located in a refrigerator door or inner wall of the refrigerator.

BACKGROUND OF THE INVENTION

Access to cool water from a water dispenser in a refrigerator door is well known in the art. The typical refrigerator uses an electric solenoid operated valve controlled by a switch to turn on the water flow at the point of dispensing. The electric solenoid operated valve used in the typical refrigerator is labor intensive during the assembly of the wire and switch. Further, the material for the electric solenoid operated valve generates a significant cost for the switch, wire and valve. In addition, the solenoid valve used in the typical refrigerator of the prior art is prone to mineral deposits which can build up causing drips and leaks.

SUMMARY OF THE INVENTION

It is the intent of the invention to address the aforementioned concerns by providing a water valve that is simpler and cheaper to manufacture and install and does not have the disadvantages inherent with an electric solenoid operated valve.

The present invention provides a water dispenser valve assembly for a refrigerator having a water line in fluid communication to a source of fluid, wherein the valve assembly includes a tubing fluidly connected to the water line by a barb fitting connection at one end and connected to a dispensing port at an opposing end, the tubing defines a fluid passageway therein from the water line to the dispensing port. The water dispenser valve assembly also includes means to selectively opening and closing the fluid passage in the tubing.

In another aspect of the invention the means for selectively opening and closing a fluid passageway includes a spring mechanism having a leaf spring connected to a pinching member, wherein the leaf spring biases the pinching member to pinch the tube for closing the passageway.

In another aspect of the invention, the means for selectively opening the fluid passageway further includes a lever member communicating with the spring mechanism for opening the fluid passageway. The water dispenser valve assembly further includes an actuator accessible to a user for activating the lever member.

In yet another aspect of the invention, the tubing in the valve assembly is connected to the water line by barb connectors that provide leakproof connections.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
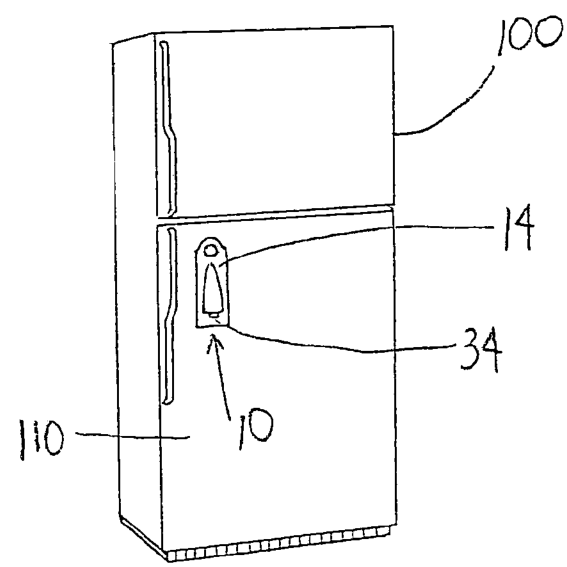
FIG. 1 is a perspective view of a water dispenser in a refrigerator door according to the present invention.

A water valve 10 and portions thereof used to dispense water from a refrigerator 100 are shown in FIGS. 1–5. The valve 10 provides connection to a water line 102 and cooling system to provide access to cooled water for delivery from the refrigerator door 110 or interior wall of the refrigerator. The valve 10 opens and closes a tube 120 defining a passageway for the water. The valve 10 can be positioned within a refrigerator door 110 for access to the dispenser 34 from either the exterior of the refrigerator 100 as shown in FIG. 1 or from an interior wall (not shown) of the refrigerator 100. The valve 10 also has utility in boats, airplanes and other environments having access to a source of drinkable water or other liquid.

The valve 10 is a spring assembly 10 with a pivot member 12 and a cover plate 14. The pivot member 12 is connected to a resilient member 16 for moving a pinch member 18 to open and close a fluid passageway for the water. The valve 10 further includes an actuation member 20 providing means for the operator to activate the dispenser 34 by opening the fluid passageway for the water. The actuation member 20 has a stem 21 extending through aperture 24 in the cover plate 14 and in contact with one end 27 of the pivot member 12. The pivot member 12 is pivotally connected to a wall portion (not shown) of the refrigerator 100 at end pivot roller 28 spaced distally from end 27.

Figure 2A:
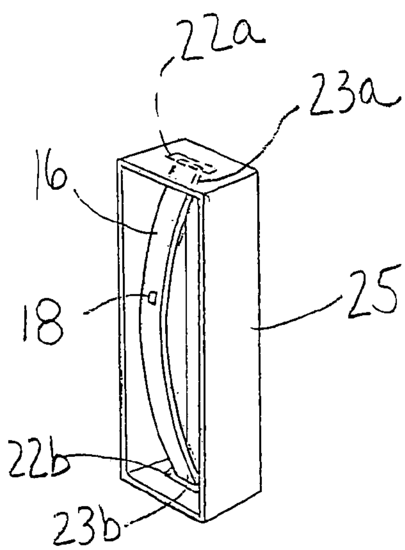
FIG. 2*a* is a perspective view of a spring in a housing used for the water dispenser of the present invention.
Figure 2:
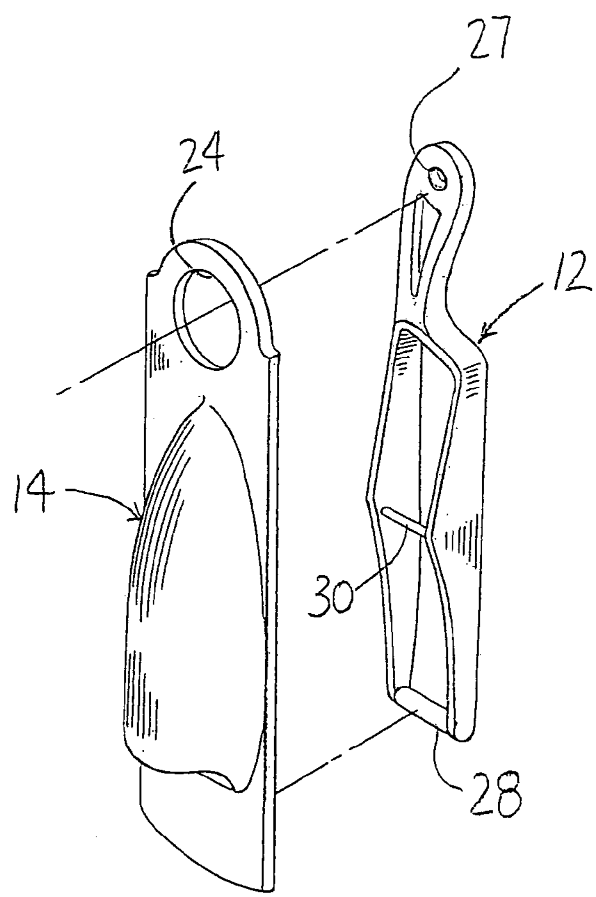
FIG. 2 is an exploded view showing two components of the water dispenser.
Figure 4:
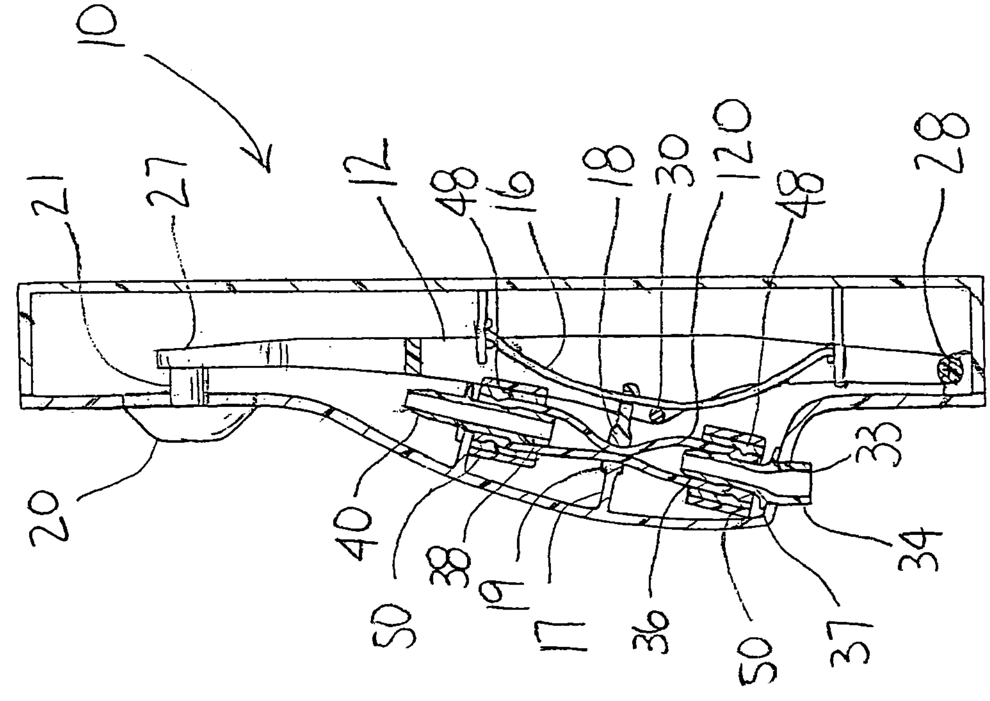
FIG. 4 is a side sectional view of the assembled valve assembly in the closed/off position.
Figure 3:
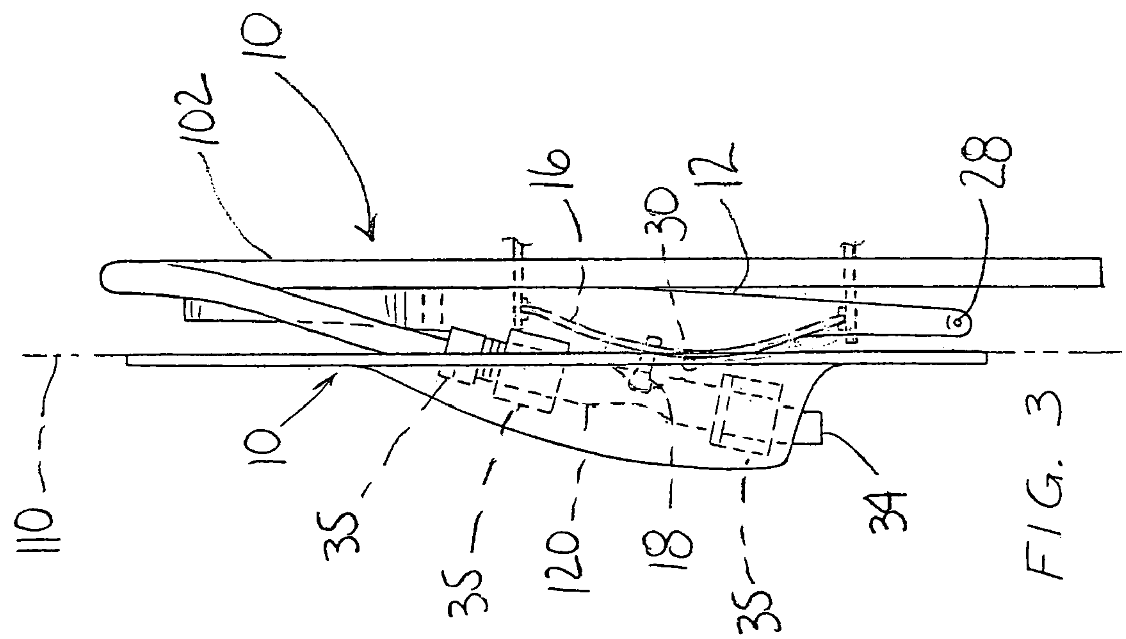
FIG. 3 is a side elevational view of the water dispenser showing certain components in phantom

The resilient member 16 has the shape of a leaf spring, as shown in FIG. 2*a*. Each end 23*a*, 23*b* of the resilient member 16 is secured to support members 22*a* and 22*b* which are connected to opposite ends of a housing 25 having the configuration of a frame. The support members 22*a* and 22*b* respectively are spaced from each other at a distance less than the length of the resilient member 16 so that the resilient member 16 has a bowed configuration as shown in FIGS. 2*a*, 3 and 4 in its natural, biased position. The support members 22 and 24 are steel pockets to prevent excess erosion of the plastic resilient member 16. The pinch member 18 has one end operatively connected to the resilient member 16, and another end in contact with the tube 120 for moving against the tube 120 and providing the greatest possible pinching force on the tube 120 as shown in FIG. 4. The greatest pinching force is provided if the pinch member 18 is located proximate to the center of the resilient member 16. For connection with the resilient member 16 the pinch member 18 may have an opening (not shown) through which the resilient member 16 is placed during construction.

A lever bar 30 is integrally formed to the pivot member 12. The lever bar 30 initiates the movement of the resilient member 16 when the actuation member 20 is activated. The lever bar 30 and pinch member 18 further guides the movement of the resilient member 16. The resilient member 16 is positioned behind the lever bar 30 relative to the tube 120 so that the lever bar 30 is between the tube 120 and the resilient member 16. The lever member 30 prevents over-extension of the resilient member 16. As stated supra, the pinch member 18 is located above the lever member 30 to position the pinch member 18 at the center of the resilient member 16 for delivery of the greatest possible pinching force. As shown in FIG. 4, the cover plate 14 may include a horizontal wall 17 which extends from the inner surface of the cover plate 14. The horizontal wall 17 is positioned opposite from the pinch member 18. The horizontal wall 17 aligns the tube 120 and prevents the entire tube 120 from moving when pressure is applied by the pinch member 18. Therefore, the horizontal wall 17 facilitates the closing of the passageway in the tube 120 when pressure is applied by the pinch member 18. The horizontal wall 17 may include a cushioned end 19 to protect the sleeve/sock 44, which envelopes the tube 120 as discussed hereinafter.

Figure 6:
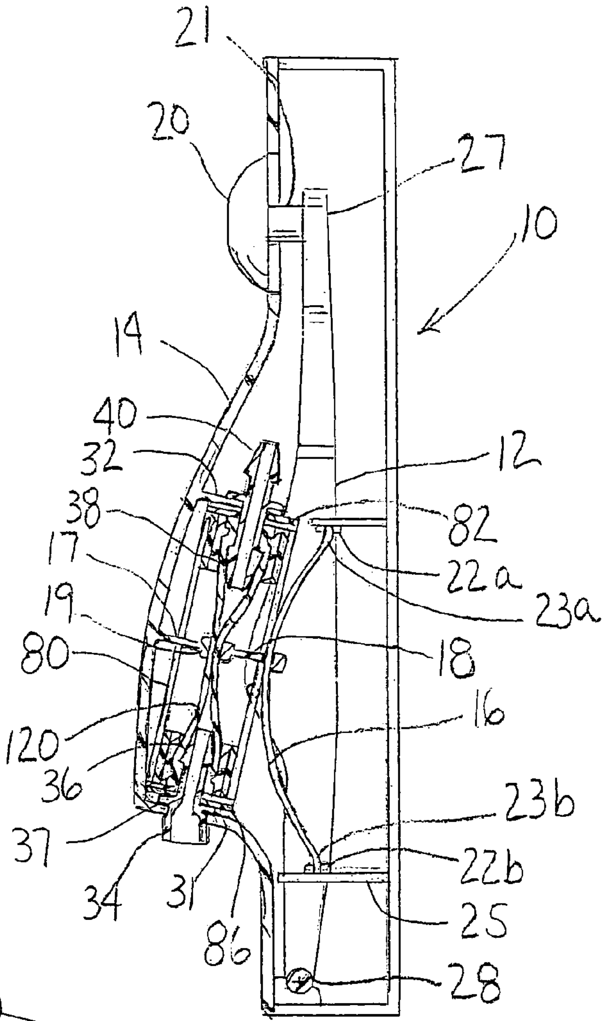
FIG. 6 is a side elevational view of the water dispenser having a bezel box.
Figure 7:
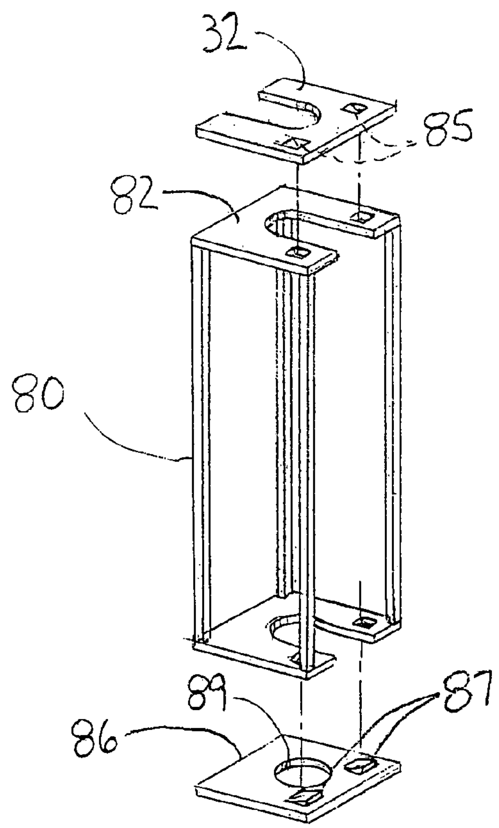
FIG. 7 is an exploded view of components associated with the bezel box.

The spring valve assembly 10 further provides leak proof connections to the water line 102 and the dispenser 34. The spring valve assembly 10 includes barb connections 35 for connecting the water feed line 102 to the tube 120 disposed in the spring valve assembly 10 and also to connect the tube 120 to an end nozzle 34. The barb connections 35 provide a connection of the tube 120 to the nozzle/dispenser 34 and the tube 120 to the water line 102. The nozzle is integrally formed as one unit with a barbed end 36 at the opposing end from the nozzle 34. The integral nozzle 34 has a flange 37 positioned against the lower inner wall 31 of the assembly 10 so that the nozzle 34 extends through an aperture 33 in the cover plate 14. The flange 37 prevents the tube 120 and integral nozzle 34 from falling out of the assembly 10. The integral nozzle 34 and barbed end 36 have a fluid passageway therethrough. The connection between the tube 120 and the water line 102 is connected by a double ended barbed device 39 having one barb connector 38 for connection to tube 120 and an opposing barb connector 40 for connection to the water line. The barb connections 35 that connect each end of the tube 120 are preferably held in place by means of a bezel box 80 as shown in FIGS. 6 and 7. The bezel box 80 has an open frame configuration having an upper and lower plate 82, 84 at opposing ends of the bezel box 80. Each plate 82, 84 has a U-shaped cut out 83 for receiving a portion of the tube 120 therethrough. The upper plate 82 is releasibly connected to inner lateral wall 32 of the valve assembly 10. Small tabs 85 extend from the lateral wall 32 for connection into apertures 81. Similarly, small tabs 87 extend from a retaining plate 86 positioned on flange 37. The lower plate 84 of the bezel box 80 has similar apertures 81 for receiving the tabs 87 on returning plate 86 for securing thereto. The retaining plate 86 has a center through aperture 89 for receiving an end portion of the tube 120. The bezel box 80 prevents lateral movement of the tube 120 within the assembly 10. The open frame configuration of the bezel box 80 allows the pinch member 18 access to the tube 120 surface.

The barb connections 35 of the present invention provide a leakproof connection. Each barb connection 35 includes a barb fitting 36, 38, or 40. The first barb fitting 36 is part of a sub-assembly integral with the nozzle dispenser 34 and has a passageway fluidly communicating with the nozzle dispenser 34. A second barb fitting 38 is positioned directly opposite the first barb fitting 36 within the bezel box 80. The second barb fitting 38 has a through aperture and fluidly communicates with a third barb fitting 40 of the double ended barbed device 39 on the opposing side of the inner lateral wall 32. The first and second barb fittings 36 and 38 respectively secure ends of the tube 120. The third barb fitting 40 secures the end of the water line 102 for fluid communication with the tube 120.

FIGS. 3 to 7 show the spring valve assembly 10 assembled with tubing connected for operation for dispensing water. The tube 120 is connected at each end to the first and second barb fitting 36 and 38, respectively. The tube 120 is connected to the first and second barb fittings 36 and 38, respectively, by retaining means as will be discussed hereinafter to provide the leakproof connection. The tube 120 is preferably made of a silicone material having excellent memory characteristics. In addition, the use of the silicone tube 120 eliminates taste and odors caused by current water dispensing systems. Further, the silicone tube 120 as used in the valve assembly 10 is self cleaning, in that the flexing of the tube 120 as it opens and closes cleans the passageway with every use.

Figure 5:
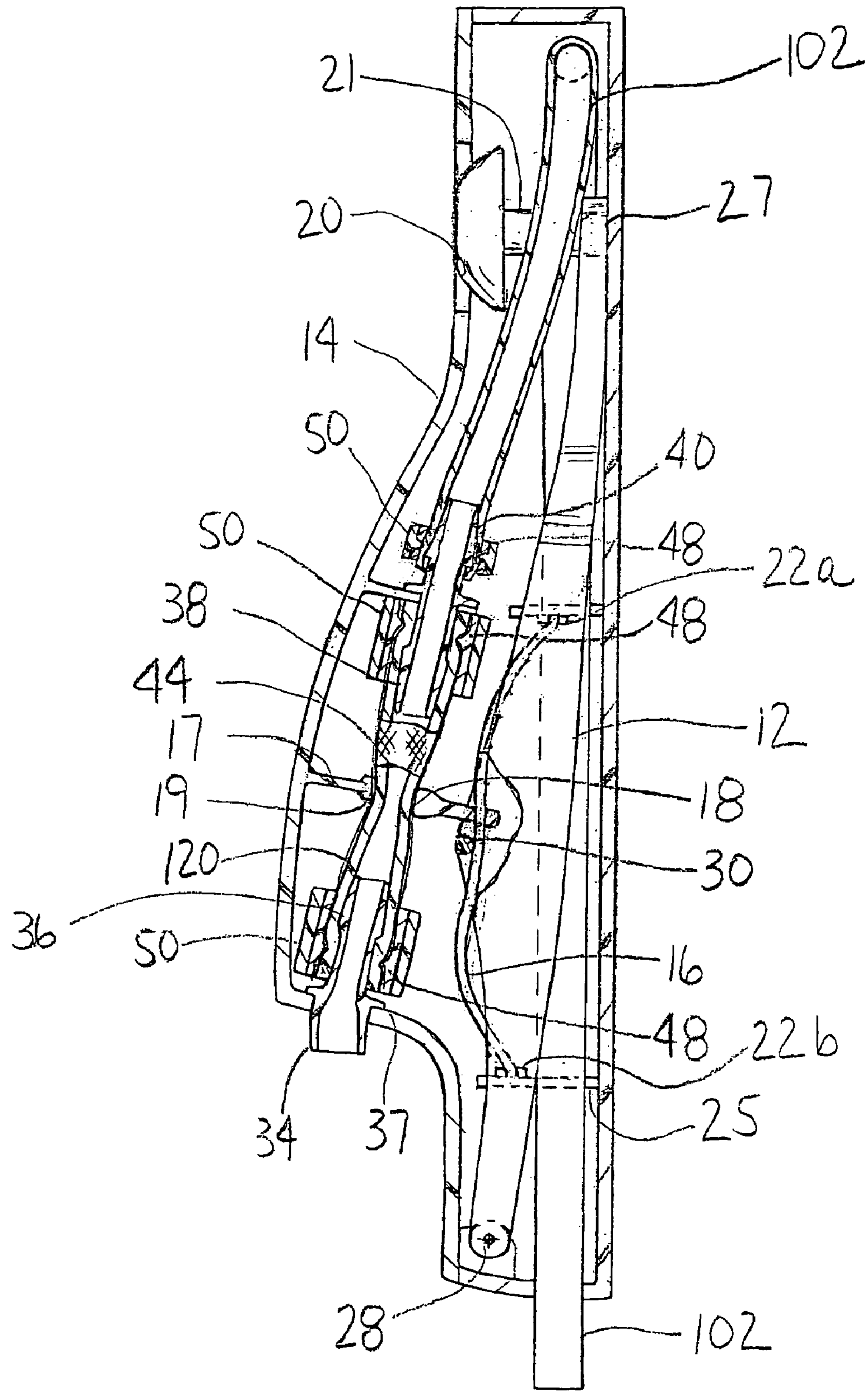
FIG. 5 is a side elevational view of the assembled valve assembly in the open/on position.

To provide added protection to the silicone tubing 30 and to prolong its life, a sock or sheathing 44 (shown in FIG. 5) preferably envelopes the tube 120 within the spring valve assembly 10. The sheathing 44 also protects the tube 120 from abrasion and excess pressure. The sock or sheath 44 is preferably a woven material made of Kevlar® or Teflon® manufactured by E.I. duPont de Nemours and Company to provide a high wear material. A cutaway portion of the woven material sheath 44 is also shown in FIG. 5. The sock/sheath 44 may also be made of a combination of the Teflon® and Kevlar® materials. Teflon® is a well-known tetrafluoroethylene fluorocarbon polymer; and Kevlar® is an aromatic polyamide fiber of extremely high tensile strength and greater resistance of elongation than steel. While the typical silicone tube 120 is capable of 15 to 20 psi pressure before failing, the composite silicone tubing with the sheath as described supra allows for high pressure applications up to 140 psi. When the barb clamp connectors connect the tube 120 to the barb fittings 36 and 38, the sheath 44 is compressed and sandwiched between the tube 120 and the barb clamp 35. In particular, the sheath 44 is compressed between the tube 120 and collet 48 as shown in FIG. 9.

Figure 8:
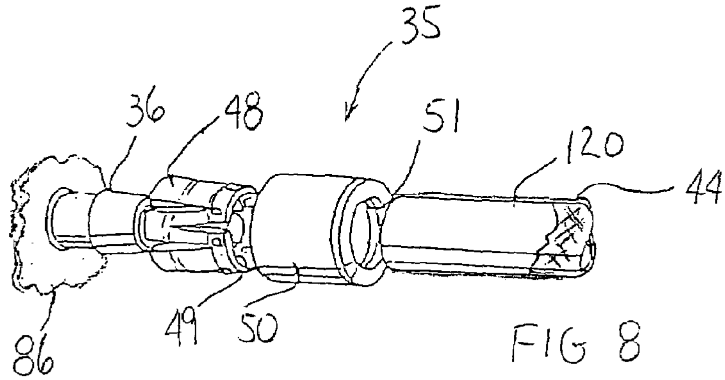
FIG. 8 is a perspective view of the barb connection of the tubing to the valve.
Figure 9:
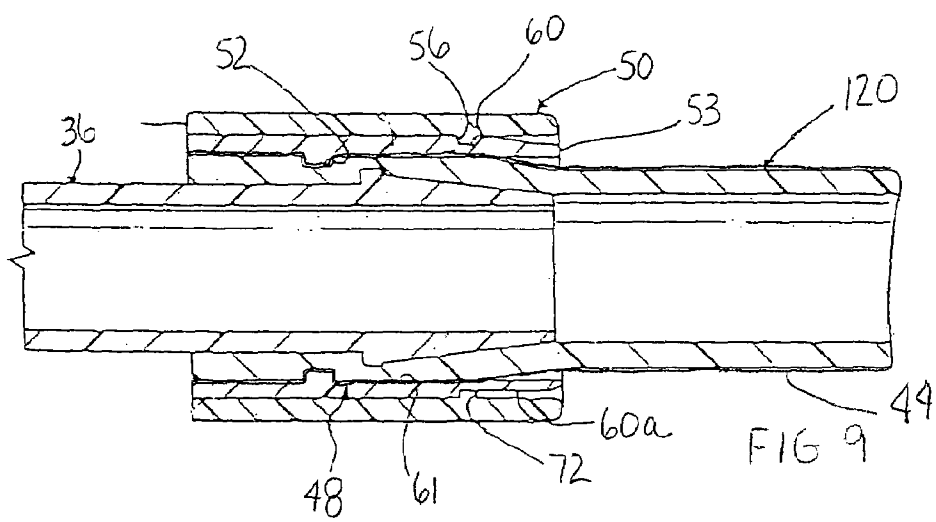
FIG. 9 is a side elevational view of the barb connection.

FIGS. 8 and 9 show the barb clamp connector for coupling the barbed fitting 36 and the flexible tube 120. The other two barb fittings 38 and 40 are similarly connected to their appropriate tubing to form the barb connections 35. The barbed fitting 36 and integral nozzle 34 is generally made of a non-metal material. The barb fittings 36, 38, 40 are preferably made of an FDA (Food and Drug Administration) approved polypropylene, silicon, TPE, TPR, etc. The barb fittings 36, 48, 40 may encompass different configurations but will generally include an expanded or barbed end for a 360° radial compression connection into the flexible tube 120.

The barb clamp or connection 35 includes a collet 48 and a sleeve 50. The collet 48 is an essentially annular member having a through aperture 49 for receiving the end of a tube 120 therein. The sleeve 50 is also an annular member with a through aperture 51 for receiving the end of the tube 120 as well as having a diameter for also receiving the collet 48 therein. The collet 48 and sleeve 50 should be made of an FDA approved material. The material should be resilient. Preferably the collet 48 is made of acetyl, silicon, or polypropylene. The sleeve 50 is preferably made of polycarbonate, silicon, or polypropylene.

Figure 10:
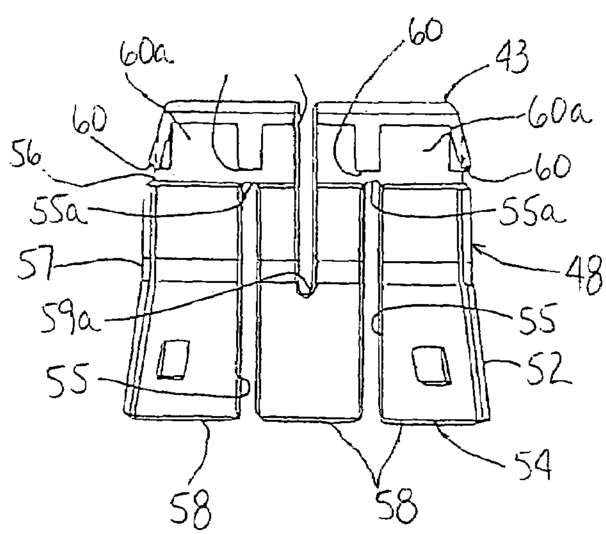
FIG. 10 is a side elevational view of the collet for the barb connection.

Looking at FIG. 10, the collet 48 has an exterior surface 52 providing resilient means for radially contracting around the tube 120. The collet 48 has a first end 53 forming a discontinuous annular ring. Along the exterior surface 52 and adjacent to the first end 53 is an annular groove 56. Moving toward the second end 54 and beyond the annular groove 56, the collet forms eight resilient tangs 58. The tangs 58 radially flare out or expand slightly at the second end 54 of the collet 48. The tangs 58 begin to flare approximately at the mid section 57 of each tang 58. The tangs 58 are formed by narrow through slots 55 extending from the second end 54 and terminating at the annular groove 56. The slots 55 are shown in FIG. 8 with rounded termination ends 55*a*, however, the termination ends 55*a* may have pointed ends.

A small ramping ledge 60 projects above each termination end 55*a* of the narrow through slots 55. The small ledges 60 provide added strength to the collet and also provide a stop means for the sleeve 50, as will be discussed hereinafter. Between each small ledge 60 there is a recessed planar portion 60*a* extending into the annular groove 56. The eight tangs 58 form a resilient seal which allow the tangs to contract around a tubular member 30. Between every other tang 58 there is a through slot 59 which extends from the first end 53 to the mid-section 57 of the associated tang 58. The through slots 59 may also have rounded termination ends 59*a* as shown in FIG. 8 or pointed termination ends 59*a*. The through slots 59 provide resiliency to the first end 53 of the collet 48 without sacrificing durability. The interior surface 61 of the collet 48 is essentially smooth except for a shelf 62 equally positioned on each tang 58 at the mid-section 57 for reasons to be discussed further.

Figure 11:
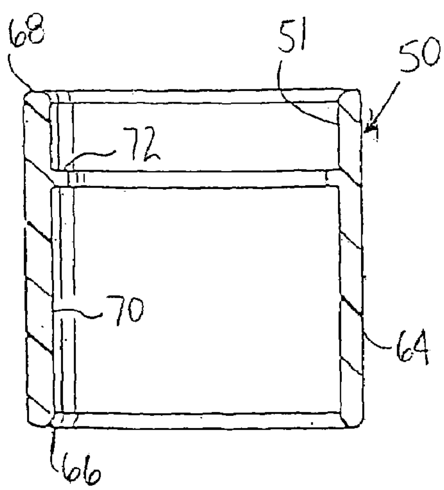
FIG. 11 is a sleeve for the barb connection.

Looking at FIG. 11, the sleeve 50 has a smooth exterior annular surface 64. The sleeve 50 has a first or bottom end 66 forming an arcuate base to facilitate assembly to the collet 48. The interior surface 70 forms a slight outward taper at the second or top end 68 of the sleeve 50. The interior surface 70 is essentially smooth throughout the length of the sleeve 50 except for an annular projection 72 that extends from the inner surface. The annular projection 72 is sized and positioned on the sleeve for disposition within the annular groove 56 of the collet 48 to form a lock when the barb clamp 35 is engaged. Therefore, the annular projection 72 is positioned proximate to the second or top end 68 of the sleeve 50.

The barb clamp is connected with the barbed fitting 36 and tube 120 as discussed hereinafter and as shown in FIGS. 8 and 9. The sleeve 50 is first placed over the end of the tube 120 so that the second or top end 68 of the sleeve 50 is spaced furthest away from the tube end. The collet 48 is then placed on the tube 120 so that the first end 53 of the collet 48 is closest to the sleeve 50. The expanded end 46 of the barbed fitting 36 is then placed into the tube 120. The expanded end 46 of the barbed fitting 36 is sized for being snugly received within the interior of the tube 120. The collet 48 is then slid over the tube 120 having the expanded end 46 of the barbed fitting 36 therein. The shelves 66 located on the interior surface 61 of the collet 48 are retainers which form a radial 360° compression around the tube 120 and under the expanded end 46 of the barb fitting so that the barb fitting 36 cannot easily move out of the tube 120. The sleeve 50 is then slid over the collet 48 such that the first or bottom end 66 of the sleeve 50 initially encounters the first end 53 of the collet 48. As the sleeve 50 moves over the collet 48, the tangs 58 on the collet 48 are pushed radially inwardly into the tube 120 and barbed fitting 36, so that the annular shelf 62 of the collet 48 is pressed inwardly into the tube 120 and barbed fitting 36 to provide a tight seal therebetween and thereby lock the annular shelf 62 under the barb 46. The sleeve 20 continues over the collet 48 until the annular projection 72 on the interior surface 70 of the sleeve 50 sits within the annular groove 56 of the collet 48. The small ledges 60 on the exterior surface 64 of the collet 48 provides a stop and lock to prevent the annular projection 72 from moving out of annular groove 56. The barb clamp "clicks" when the collet 48 and sleeve lock together. The barb clamp or connection 35 can then only be removed with the aid of a tool so that disconnection and leakages are prevented. Once the tubes 102 and 120 are connected to the valve housing 12, the spring valve assembly is ready for operation. Each of the barb fittings 36, 38, and 40 preferably each have a barb clamp 35 formed by a collet 48 and sleeve 50 as discussed supra.

In operation of the spring valve assembly 10, the resilient member 14 is biased in a first and closed position, as shown in FIGS. 4 and 6 so that there is no leakage of fluid from the spring valve assembly 10. The pivot member 12 is in its generally vertical position relative to the door of the refrigerator and the pinch member 18 engages the tube 120 to close the flow of water to the exit nozzle 34. The engagement of the pinch member 18 is such that the resilient member 16 is trying to extend to its maximum arch height which allows the pinch member 18 to apply a self-compensating amount of force to keep the tube 120 pinched closed for extensive periods. Therefore, the valve assembly 10 is biased to apply force to the resilient member 16 through pinching member 18 which causes the resilient member to make a bow forcing the pinching member 18 into the walls of the tube 120 to shut the fluid flow.

When it is desired to provide a flow of water from the water dispenser 34, the operator applies pressure to the actuation member 20, which in turn applies pressure to end 27 of the pivot member 12 via stem 21 so that the pivot member 12 pivots about roller 28. The movement of a lever 24 forces the pivot member 12 to apply a force upward on the resilient member 16 causing the resilient member 16 to invert back to a retracted position. This movement disengages the pinch member 18 from the tube 120 allowing the fluid to pass through the tube 120, as shown in FIG. 5. The resilient member 14 undergoes an S type conversion when moving from the first to a second and opened position. Spring limiters 47 are located along the side walls adjacent the pivot member 12 to prevent the resilient member 16 from deflecting to the full upward position. Once pressure is released from the actuation member 20, the resilient member 16 moves back to its biased and bowed position to again close the passageway in tube 120.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. As one example of an equivalent arrangement is to have the tabs 85, 87 located on the plates 82, 84 of the bezel box 80 and the apertures 81 located on the wall 32 and retaining plate 86.

What is claimed is:

1. A water dispenser valve assembly for a refrigerator having a water line in fluid communication to a source of water, the valve assembly comprising:

a tube fluidly connected to the water line by a barb fitting connection at one end and connected to a dispensing nozzle at an opposing end, said tube defining a fluid passageway therein from the line to a dispensing port; and means for selectively opening and closing the fluid passageway in the tube, wherein the barb fitting connection includes a barb fitting, a collet and a sleeve, the collet engageable over one end of the barb fitting and tube, and the sleeve having a through center aperture for receiving the collet.

2. The water dispenser valve assembly of claim 1, wherein the means for selectively opening and closing the fluid passageway includes a spring mechanism having a leaf spring connected to a pinching member, wherein the leaf spring biases the pinching member to pinch the tube for closing the passageway.

3. The water dispenser valve assembly of claim 2, wherein the means for selectively opening the fluid passageway further includes a pivot member communicating with the spring mechanism for opening the fluid passageway.

4. The water dispenser valve assembly of claim 3, further comprising an actuator accessible to a user, said actuator operable to activate the pivot member.

5. The water dispenser valve assembly of claim 1, wherein the tube is covered by a snug fit sock made of a woven material of polyamide fiber having high tensile strength and a greater resistance of elongation than steel to protect the tube from abrasion and excess pressure.

6. The water dispenser valve assembly of claim 2, wherein the leaf spring is retained within pockets to prevent excess erosion.

7. The water dispenser valve assembly of claim 5, wherein the tube is made of silicone for providing excellent characteristics.

8. The water dispenser valve assembly of claim 2, further comprising a housing having a pair of spaced parallel walls, wherein said parallel walls have pockets for securing ends of the leaf spring.

9. The water dispenser valve assembly of claim 2, wherein the spring mechanism includes a pinch member operably coupled to the leaf spring.

10. The water dispenser valve assembly of claim 1, wherein the collet has an exterior surface and an annular groove in the exterior surface proximate to a first end of the collet, and the exterior surface further has a plurality of ledges extending therefrom, wherein the ledges are positioned adjacent the annular groove for providing a stop for the sleeve.

11. The water dispenser assembly of claim 1, wherein the dispensing nozzle is integrally formed with a barb fitting, said barb fitting positioned at an opposing end from the nozzle.

12. A water dispenser valve assembly, for a refrigerator having a water line in fluid communication to a source of water, the valve assembly comprising:

a tube fluidly connected to the water line by a barb fitting connection at one end and connected to a dispensing nozzle at an opposing end, said tube defining a fluid passageway therein from the line to a dispensing port;

means for selectively opening and closing the fluid passageway in the tube; and a bezel box having an open frame configuration for minimizing lateral movement of the tube, wherein the bezel box has an upper plate and lower plate and each plate has means for securing the bezel box within the assembly.

13. The water dispenser assembly of claim 12 wherein each plate has a through slot for receiving a portion of the tube therethrough.

14. The water dispenser assembly of claim 12, wherein the barb fitting connection includes a collet and a sleeve, the collet having resilient means for radically contracting around the tube to form a radial 360° compression around the tube when locked over the barb fitting connection by the sleeve.

15. In a refrigerator water dispenser valve assembly having a water line in fluid communication to a source of water and connected to a tube at one end, the tube defining a fluid passageway therein, the tube fluidly connected to the water line by a barb fitting connection at the one end and connected to a dispensing nozzle at an opposing end, the improvement comprising a spring mechanism for selectively opening and closing the fluid passageway, said mechanism having a leaf spring connected to a pinching member, wherein the leaf spring is biased to close the fluid passageway by positioning a pinching member to pinch the tube, wherein the barb fitting connection includes a barb fitting, a collet and a sleeve, and the collet is engageable over one end of the barb fitting and tube, and the sleeve has a through center aperture for receiving the collet.

16. The improvement of claim 15, wherein the tube is covered by a snug fit sock made of an aromatic polyamide fiber having extremely high tensile strength and greater resistance of elongation than steel to protect the tube from abrasion and excess pressure.

17. The improvement of claim 15, wherein the collet has resilient means for radically contracting around the tube to form a radial 360° compression around the tube when locked over the barb fitting connection by the sleeve.

* * * * *